Patented June 13, 1944

2,351,161

UNITED STATES PATENT OFFICE 2,351,161

BISMUTH-CONTAINING DERIVATIVE OF TRIHYDROXY GLUTARIC ACID AND PROCESS OF MAKING IT

Alvah Lloyd Taylor, Kew Gardens, N. Y., and Kruger W. Wallen, Murfreesboro, Tenn.

No Drawing. Application August 2, 1940,
Serial No. 350,068

4 Claims. (Cl. 260—447)

Our invention relates to new bismuth derivatives of trihydroxy glutaric acid, in the form of alkali-metal and ammonium salts, and to the process of producing them.

We have found that the alkali-metal and the ammonium salts of the various trihydroxy glutaric acids, after first being heated in solution with excess alkali (although that may be omitted if the acid is ribo-trihydroxy glutaric acid), will react with bismuth compounds to produce new bismuth-containing derivatives of such salts; which have beneficial physiological actions and comparatively low toxicity.

In carrying out our invention, we add to a trihydroxy glutaric acid enough sodium hydroxide (or potassium hydroxide or ammonium hydroxide) to neutralize the acid, and approximately 20 to 25% more unless ribo-trihydroxy glutaric acid is used. The salt solution thus obtained is heated to about 75° C. for at least ten minutes. Then, with the solution at or very close to 75° C., dry bismuth hydroxide is slowly added, with stirring, until no more dissolves. The temperature is then maintained at about 75° C. for a short time longer, say 10 or 15 minutes, to make certain that the action is complete; whereupon the resultant product is permitted to cool. The pH of the solution is then adjusted, conveniently by the addition of acetic acid, to about pH 9.6 if a di-sodium salt is desired, and to about pH 7.2 if a mono-sodium salt is desired. In either case, the salt may be precipitated by pouring the bismuth-containing solution into an alcohol-water mixture of such proportions that the alcohol concentration is in the neighborhood of 50–75%. The precipitate thus obtained may be suitably separated, as by filtration, and dried as over phosphorous pentoxide.

The following are examples of our process:

Example 1

To about 20 gm. of xylo-trihydroxy glutaric acid syrup there is added enough 5N sodium hydroxide to give about pH 7.2–7.4, and then about 20 to 25% excess sodium hydroxide beyond that. This yields a sodium salt, in the solution. This salt solution is placed on a steam bath, and heated to about 75° C., and that temperature maintained for 10 to 15 minutes. Then, with the temperature still maintained at or about that point, there is added bismuth hydroxide in small increments, until no more dissolves; and the temperature is maintained until 10 or 15 minutes after that. Then the solution is removed from the steam bath, and allowed to cool.

To the cool solution we add glacial acetic acid to produce the desired pH. If a mono-sodium salt is desired, we add enough acetic acid to produce a pH of about 7.2–7.4; but if a di-sodium salt is desired, we add only enough to produce a pH of about 9.5–9.7. The solution is desirably allowed to stand for a while, as over night, and then filtered to remove any impurities, and any adjustment of pH made that is necessary to maintain the desired di-sodium salt, as by the addition of acetic acid and sodium hydroxide. Then the solution is poured into an alcohol-water mixture, to precipitate the sodium salt of the bismuth compound, and the whole allowed to stand in the cold for several hours or until the precipitation which occurs is complete. The water-alcohol mixture should be of an alcohol concentration which gives optimum results in the quality and quantity of the precipitate obtained; which varies somewhat with different preparations (according to the amount of impurities present), and can readily be determined by adding a one cc. portion of the bismuth solution to 10 cc. portions of different concentrations of the alcohol-water mixture within the general range of 50–75% alcohol concentration; and desirably as low an alcohol concentration is used as is consistent with the maximum quantity and optimum quality of the precipitate. The volume of the dilute alcohol into which the bismuth solution is poured should be of the order of 8 to 10 times that of the bismuth solution.

After the precipitation has been made, the precipitate is suitably separated, as by decanting and/or filtration; and the precipitate is desirably washed with absolute or highly concentrated alcohol, and then with absolute or highly concentrated ether. The washed precipitate is then dried, first in a vacuum oven at a temperature of about 70° C. or lower, and then over phosphorous pentoxide or other desiccant in a vacuum desiccator.

When our product is completely dried, it dissolves readily in water when dusted thereon, without leaving any cloudy trace; but when it is incompletely dried, or if it is allowed to stand exposed to the air for awhile, then when dusted on water it dissolves less completely and leaves a milky trail. The material which thus leaves a milky trail when dusted on water, however, whether originally incompletely dried or subsequently permitted to take up water from the air, may be made dry in a desiccator, as over phosphorous pentoxide; and when so made dry will dissolve completely and without trail in water when dusted thereon.

When the di-sodium salt is obtained, as above described, it remains such if the amount of acetic acid which is added is no more than enough to lower the pH to the neighborhood of 9.5–9.7. However, if more acetic acid than that is added, as to lower the pH to about 7.2–7.4, then we think that at least some of the di-sodium salt is converted into the mono-sodium salt. Probably the conversion into the mono-sodium salt is not complete. This is indicated by the analyses of the precipitates which are obtained.

If the precipitate obtained by pouring into the water-alcohol mixture was with the bismuth solution at about pH 9.6, to get a precipitate of the di-sodium salt, a typical analysis showed 49.6% of bismuth and 10.75% of sodium.

If the precipitate obtained by pouring into the water-alcohol mixture was with the bismuth solution at about pH 7.3, to get a precipitate largely of the mono-sodium salt, a typical analysis showed 51.4% of bismuth and 7.5% of sodium. In some instances, the analysis of the mono-sodium salt showed sodium as low as 6.4%; but even that indicates that the conversion of the di-sodium salt to the mono-sodium salt was not complete.

Both the mono-sodium salt and the di-sodium salt have a very high solubility in water at room temperature; for one gram of either will dissolve in less than 1 cc. of water. These new bismuth-containing salts are also soluble in water-alcohol mixtures up to about 40% alcohol concentration, at room temperature; but are quite insoluble in such mixtures where the alcohol concentration exceeds about 60–65%.

The mono-sodium salt gives solutions in water of about pH 6.9 to 7.3, and the di-sodium salt gives solutions in water of about 8.6 to 9.7, both depending on the concentration. The water solutions thus formed are excellent electrolytes, for under the influence of a direct current all the bismuth migrates to the positive electrode, where its amount can be measured quantitatively. Thus these new bismuth-containing salts furnish an excellent means for the quantitative determination of bismuth. These electrolytes are thus also suitable for bismuth electroplating. The new bismuth compounds are also indicated for pharmaceutical use, specifically as anti-spirocheticidal agents; for which they are well adapted, because their toxicity is relatively low and they are relatively non-irritating on injection.

*Example 2*

Instead of using the xylo-trihydroxy glutaric acid syrup of Example 1, we may use instead corresponding amounts of any other trihydroxy glutaric acid—ribo-trihydroxy glutaric acid, d-arabo-trihydroxy glutaric acid, or l-arabo-trihydroxy glutaric acid. The procedure is the same as outlined in Example 1, save that if ribo-trihydroxy glutaric acid is used it is not necessary (although it is not harmful) to add the 20 to 25% excess of sodium hydroxide beyond that required for the neutralization.

In all cases, whatever the trihydroxy glutaric acid used, the final bismuth salts obtained seem to be the same. At least, we have not as yet found anything to distinguish one from another, other than the di-sodium or mono-sodium distinguishing features, and they are the same whatever the starting trihydroxy glutaric acid used.

While we have not indisputably established the exact structural formulas for our compounds of mono- and di-sodium salts of bismuth-containing glutaric acid, we have established the following facts concerning these products:

*a.* There is definitely only one atom of bismuth in a molecule.

*b.* Applicants' mono-sodium and di-sodium salts would have a molecular weight of 408 and 430 respectively. Bismuth would then be between 48% and 49% in the di-sodium salt and between 51% and 52% in the mono-sodium salt. This corresponds fairly closely, and within the limits of experimental error, to the observed values given in the foregoing specification.

We claim as our invention:

1. The steps in the process of making a bismuth-containing derivative of trihydroxy glutaric acid, which consists in treating xylo-trihydroxy glutaric acid in solution with an excess of a hydroxide of the class consisting of alkali-metal and ammonium hydroxides, and then subjecting it to elevated temperature in the presence of bismuth hydroxide.

2. The steps in the process as set forth in claim 1, with the addition that acid is added to lower the pH and that the solution so obtained is poured into a dilute-alcohol solution to precipitate the bismuth-containing salt produced.

3. The steps in the process of making a bismuth-containing compound, which consists in neutralizing a ribo-trihydroxy glutaric acid in solution with a hydroxide of the class consisting of alkali-metal and ammonium hydroxides, and then subjecting it to elevated temperature in the presence of bismuth hydroxide.

4. The steps in the process of making a bismuth-containing compound, which consists in over-neutralizing a trihydroxy glutaric acid in solution with an excess of a hydroxide of the class consisting of alkali-metal and ammonium hydroxides, and then subjecting it to elevated temperature in the presence of bismuth hydroxide.

ALVAH LLOYD TAYLOR.
KRUGER W. WALLEN.